United States Patent
Turchetta et al.

(10) Patent No.: US 8,195,315 B2
(45) Date of Patent: Jun. 5, 2012

(54) DETECTION OF INCONSISTENCIES BETWEEN A REFERENCE AND A MULTI FORMAT SOUNDTRACK

(75) Inventors: Daniele Turchetta, Rome (IT); Roberto Furlan, Piove di Sacco-PD (IT)

(73) Assignee: Thomson Licensing, Boulogne-Billancourt (FR)

( * ) Notice: Subject to any disclaimer, the term of this patent is extended or adjusted under 35 U.S.C. 154(b) by 1353 days.

(21) Appl. No.: 11/596,600

(22) PCT Filed: Sep. 15, 2004

(86) PCT No.: PCT/EP2004/010339
§ 371 (c)(1),
(2), (4) Date: Nov. 15, 2006

(87) PCT Pub. No.: WO2005/111716
PCT Pub. Date: Nov. 24, 2005

(65) Prior Publication Data
US 2007/0211906 A1 Sep. 13, 2007

(30) Foreign Application Priority Data

May 17, 2004 (IT) .............................. MI2004A0985

(51) Int. Cl.
G06F 17/00 (2006.01)
G06F 7/02 (2006.01)
H04R 29/00 (2006.01)
G03B 31/00 (2006.01)
H03M 13/00 (2006.01)

(52) U.S. Cl. ................. 700/94; 381/56; 352/8; 714/819

(58) Field of Classification Search .................... 700/94; 352/1, 5, 8, 11, 12, 25, 26, 31; 360/47, 61; 369/1, 2, 4, 5, 47.14, 47.15, 47.16, 47.18, 369/47.23; 714/799, 819
See application file for complete search history.

(56) References Cited

U.S. PATENT DOCUMENTS 4,455,634 A 6/1984 Efron et al.
(Continued)

FOREIGN PATENT DOCUMENTS

JP H07-78423 3/1995
(Continued)

OTHER PUBLICATIONS

Search Report dated Feb. 1, 2005.

*Primary Examiner* — Davetta W Goins
*Assistant Examiner* — Daniel Sellers
(74) *Attorney, Agent, or Firm* — Robert D. Shedd; Robert B. Levy (57) ABSTRACT

Automatic detection of errors among different formatted sound tracks of the same language on a motion picture film stock can be achieved by first acquiring successive audio segments from each of the sound tracks. During a time window of prescribed duration, the audio of each different formatted track undergoes analysis to yield a numeric value. The successive analysis of the audio continues until no further audio exists for analysis. The resultant collection of numeric values undergoes formatting into a numeric file for comparison against a reference file representing audio obtained from a particular source, such as originally recorded material, a sound print, or a duplicated copy of a sound film. If the difference between a formatted numerical file and the reference file exceeds a threshold value, then an error exists in that formatted sound track, and an operator can take appropriate action.

13 Claims, 5 Drawing Sheets

U.S. PATENT DOCUMENTS

| | | | |
|---|---|---|---|
| 4,746,991 A | 5/1988 | Efron et al. | |
| 5,313,280 A * | 5/1994 | Straus | 348/181 |
| 5,757,465 A * | 5/1998 | Seagrave et al. | 352/11 |
| 6,965,597 B1 * | 11/2005 | Conway | 370/389 |
| 7,197,452 B2 * | 3/2007 | Hands | 704/200.1 |
| 7,197,458 B2 * | 3/2007 | Lydecker et al. | 704/270 |
| 7,702,014 B1 * | 4/2010 | Kellock et al. | 375/240.08 |
| 2003/0086341 A1 * | 5/2003 | Wells et al. | 369/13.56 |

FOREIGN PATENT DOCUMENTS

| | | |
|---|---|---|
| JP | 2002-109731 | 4/2002 |
| WO | WO 01/41452 | 6/2001 |

\* cited by examiner

DETECTION OF INCONSISTENCIES BETWEEN A REFERENCE AND A MULTI FORMAT SOUNDTRACK

This application claims the benefit, under 35 U.S.C. §365 of International Application PCT/EP2004/010339, filed Sep. 15, 2004, which was published in accordance with PCT Article 21(2) on Nov. 24, 2005 in English and which claims the benefit of Italian patent application No. MI2004A000985, filed May 17, 2004.

TECHNICAL FIELD

This invention relates to checking the contents of multiple sound channels, and in particular, to checking soundtracks on a motion picture film stock.

BACKGROUND OF THE INVENTION

Typically, motion picture films released for public exhibition include four soundtracks each recorded in a different format. The four different format soundtracks collectively comprise a "quad" format optical soundtrack. The quad format advantageously allows reproduction by equipment compatible with any one of the four-recorded formats. The four separate audio tracks have different locations on the film. For example, the sound track for a Digital Theater System Corp. or DTS® formatted sound file lies between the edge of the film frame and the SMPTE standardized location for a variable area audio track. (DTS® is a registered mark of the Digital Theater System Corp.) The DTS® code track provides a synchronization signal for an external DTS® CD player which can provide six audio channels. A Dolby SR® encoded track lies in the variable area audio track position and this signal provides backwards compatibility for cinema sound processors incapable of signal decoding. (Dolby SR® is a registered mark of Dolby Laboratories Inc.) The Dolby SR® track offers the simplest reproducing system, namely a stereo formatted audio signal, or stereo plus two additional channels. A Dolby Digital® (SR.D) track lies in the area between film perforations and supports six channels of audio and is typically known as 5.1. A fourth recording format developed by Sony and known as Sony Dynamic Digital Sound® or SDDS® offers eight channels of audio with data recorded at the edges of the film. (Sony Dynamic Digital Sound® and SDDS® are registered marks of Sony Corp.) In this way, the quad format optical soundtrack offers enhanced playback capability that is backwardly compatible with stereo variable area (SVA) cinema sound processors.

To appreciate the composition of the quad format soundtrack, a consideration of the original sound assembly procedures will be helpful. A typical mixing operation to create a quad format sound track combines various separate sources, including dialogue, sound effects, ambiance, and music, with each originating from mono or multi-track sources. The mixing operation yields a six channel discrete sound format known as the original master mix. The term discrete sound format typically means that no relationship exists among different channels. The original master mix includes dialogue that represents about 95% of the normal sound content and is usually located in the center channel, sometimes 5% can be located or combined on left and/or right or surround channels and manipulated for effect, for example emanating from a radio, TV or telephone. If required, an operator can add reverberation on the center channel alone, or occasionally on the lateral or surround channel. Sound effects related to the dialogue, such as foot steps, etc exist with the dialogue in the center channel. Other effects can be located on the lateral or surround channels to increase the sound perspective. Special effects normally exist on all channels depending to the required result. Action ambiance is normally located in the lateral or surround channels. However, sometimes an operator will place the ambience in the center channel if such ambience exists as part of the original sound track. If an original music recording exists in a multi-channel format, the center channel will typically contain any solo instrument or vocalist. The lateral, surround and subwoofer channels provide the main support for the sound contents.

During mixing of various signals, audio processors can provide reverberation and can add perspective by the use of delay or special filter functions, simulation on music or ambiance. These acoustic enhancements, while fully permissible, nonetheless can introduce unexpected and undesired phase shifts, during encoding, such as by as Dolby SR® encoding, and subsequently reproduced in a monaural or a two-track stereo format.

In the digital film domain, the discrete tracks can very faithfully deliver to the listener the original sound perspective of the master mix. However, the various coding algorithms employed by the three digital systems can introduce differences into the sound. For example, one encoding system includes the subwoofer channel sound content in the surround channels, thus using just five tracks instead of six.

Mixing the original six channel master mix into a four track master mix yields an analog format audio signal comprising left, right, center and surround channels. These four channels are processed, for example using a Dolby SR® 4:2 spatial encoder, to form a two-track encoded audio signal which enables stereo reproduction and, in addition, also enables decoding to restore the four tracks of the master mix with substantially similar quality. The encoder output produces two encoded channels identified as Left total and Right total or Lt-Rt. These two encoded tracks pass through two Dolby SR® noise reduction processors for recording on the optical negative film. During film exhibition, these two encoded tracks are reproduced and coupled, for example, via and appropriate Dolby SR® equipped reader followed by a 2:4 decoder which transforms the encoded channels Lt-Rt to recreate the original four discrete channels, Left, Right, Center and Surround.

Ideally, the four soundtrack formats should be substantially similar in contents, if not identical, within the constraints of each individual system parameters. However, manipulation of various acoustic parameters in the digitally formatted tracks can produce unwanted and unexpected consequences, especially when using Dolby Surround encoding and decoding. Thus, a need exists need for a technique for rapidly identifying the occurrence of such unwanted acoustic consequences.

BRIEF SUMMARY OF THE INVENTION

Briefly, in accordance with a preferred embodiment of the present principles, there is provided a method for automatically detecting errors among different formatted soundtracks of the same language version without the need for a check by human listening. The method commences by acquiring contemporarily successive audio segments from each of a plurality of different formatted sound tracks. During a time window of preset duration, the audio of each different formatted track undergoes analysis to yield a numeric value. The successive analysis of the audio continues until no further audio exists for analysis. The resultant collection of numeric values undergoes formatting into a numeric file for comparison against a file representing audio obtained from a particular source, such as originally recorded material, a sound print, or a duplicated copy of a sound film. If the difference between a formatted numerical file and the comparison file exceeds a threshold value, then an error exists in that formatted sound track, and an operator can take appropriate action.

DETAILED DESCRIPTION

Figure 1:
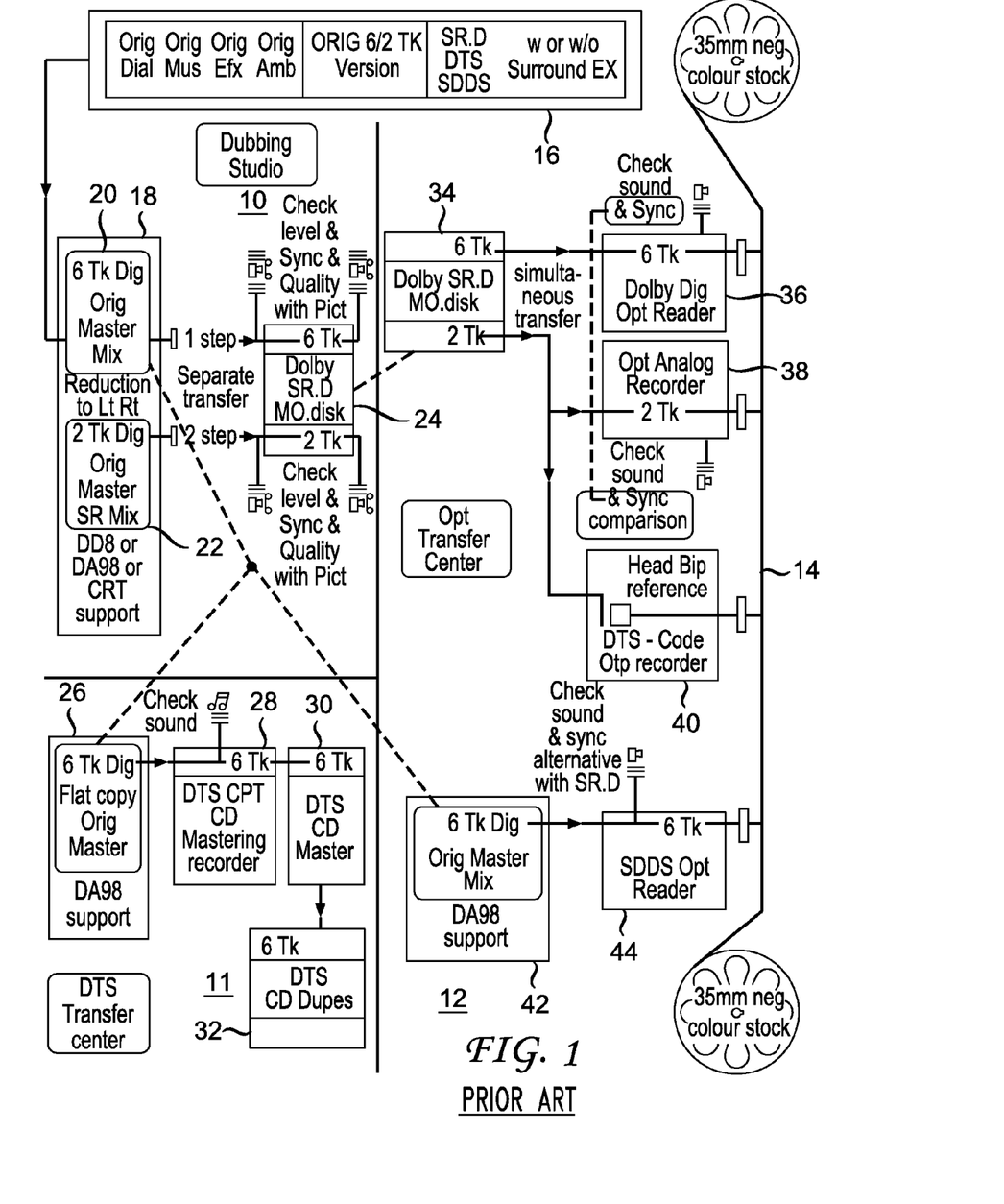
FIG. 1 shows a prior art dubbing and transfer system, which produces a quad-formatted, recorded sound track for reproduction on a motion picture film stock.

FIG. 1 depicts a prior art dubbing and transfer system employed for transferring (i.e., dubbing) audio information onto a 35 millimeter motion picture film stock 14. The system of FIG. 1 includes a Dubbing Studio 10, a Digital Theater Sound Transfer Center 11 and an Optical Transfer Center 12. The Dubbing Studio 10 receives separate audio files from at least one source 16. The source 16 comprises a plurality of different audio files, including: (a) the original dialogue, (b) the original music performances, (c) the original sound effects, and (d) the original environmental sounds, all formatted in each of the Dolby SR® digital (SR.D), DTS® and SDDS® formats, with or without Surround EX. Within the dubbing studio 10, a mixer 18 serves to mix selected audio files from the source 16. Effectively, the mixer 18 includes a six track digital mixer 20 for mixing six tracks of SR.D files and for providing two tracks of analog audio in a SR format. When dubbing of foreign languages is necessary, the dubbing studio 11 can include a separate mixer (not shown) ahead of the mixer 18 for mixing the local dialogues. A magneto-optical (MO) disk 24 serves to store the audio mixed by the mixers 20 and 22, to maintain a Dolby SR.D formatted audio file and an analog Dolby SR file.

Within the DTS transfer center 11, a mixer 26 provides a mix of audio files received from the mixer 18 in the dubbing studio 10. The mixed files from the mixer 26 are recorded by a DTS® master recorder 28. From the recording made by the DTS® recorder 28, a DTS® CD master machine 30 makes a CD master for duplication by a DTS® duplicator 32. The DTS® CD which can provide six audio channels synchronized to the DTS sound track on the film.

Within the optical transfer center 12, a MO disk 34 stores the Dolby SR.D and analog Dolby SR sound files received from the MO disk 24. The MO disk 34 simultaneously provides audio files to a Dolby® digital optical recorder 36, an analog optical recorder 38 and to a DTS® optical recorder 40, each recording respective formatted soundtracks on the film stock 14. In the illustrated embodiment, the dubbing center 10 and the optical transfer center 12 have separate MO disks 24 and 34, respectively. Rather provide a separate MO disk 34 within the optical transfer center 12; each of the recorders 36, 38 and 40 could directly access the MO disk 24 for files. With the optical transfer center 12, a mixer 42 receives the mixed files from the mixer 18 for further mixing. A SDDS® recorder 44 optically records mixed files from the mixer 44 onto the film stock 14.

In practice, the DTS® recorder 40 records a time code track on the film stock 14 in the region between the variable area audio track or tracks and the edge of the film frame. The recorder 38 writes a Dolby SR® track in the standardized sound track location, while the recorder 36 writes a Dolby SR Digital® track in the area between the perforations. At both film edges, the recorder 44 records SDDS® tracks. The four tracks recorded in this fashion, referred to as a quad format, provide an enhanced playback capability that is backward compatible with a conventional variable area analog sound system.

Figure 2:
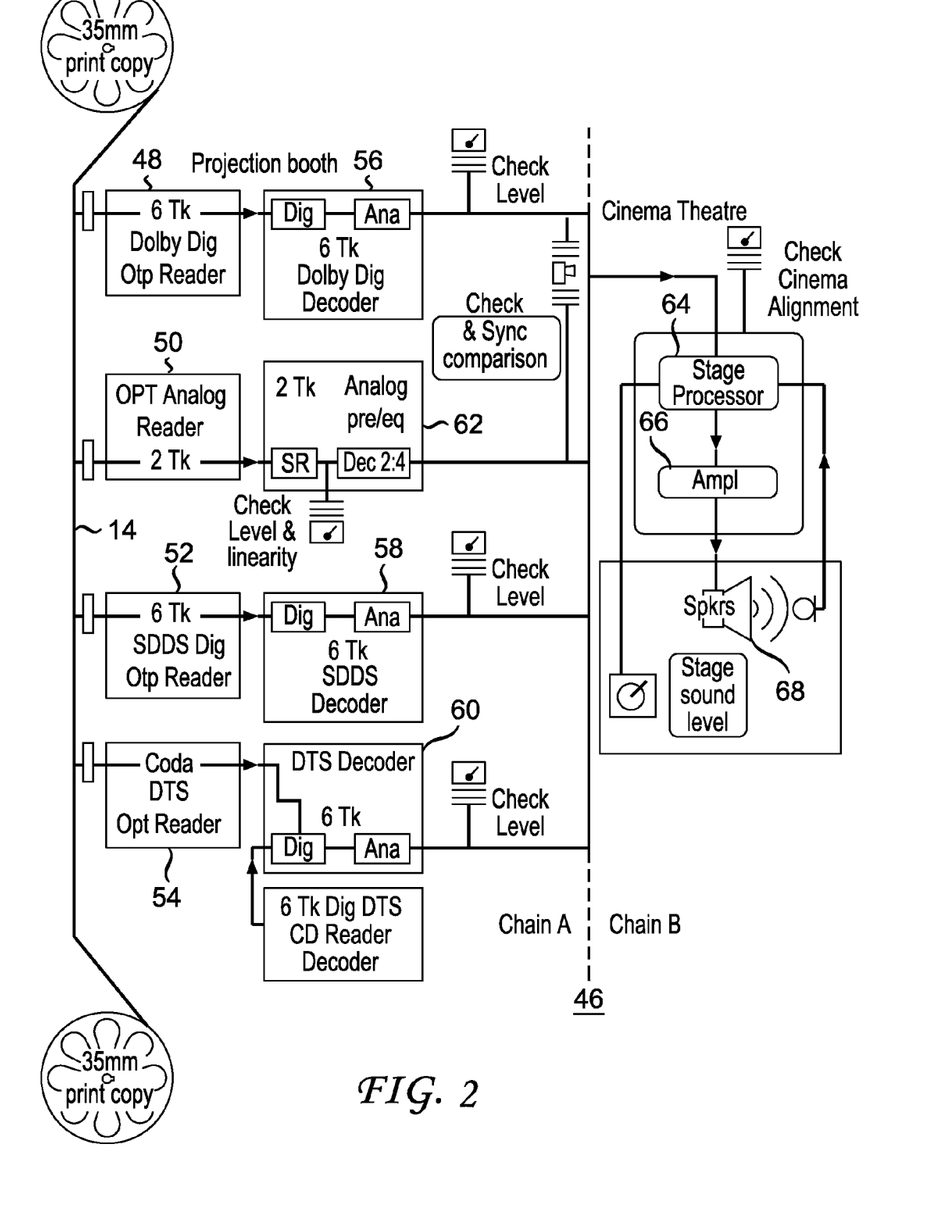
FIG. 2 shows a typical arrangement for soundtrack reproduction from a motion picture film stock.

FIG. 2 depicts a block diagram of a typical prior art audio reproduction system 46 for use in a movie theater (cinema) for reproducing each of the different audio formats recorded on the film stock 14. The reproduction system 46 of FIG. 3 includes readers 48, 50, 52, and 54, for reading the Dolby SR.D®, Dolby SR®, Sony SDDS® audio tracks, plus DTS® time code track, respectively, from the film stock 14. Each of decoders 56, 58 and 60 decodes its proprietary audio format received from its respective reader 48, 52 and 54. An analog equalizer 62 serves to equalize the analog Dolby SR® signal received from the reader 50.

A sound processor 64 processes receives the output signals from the decoders 56, 58 and 62 and the analog equalizer 52 prior to amplification by an amplifier 66 that drives a set of speakers 68. In this way, the sound processor 64 drives reproduction of the digitally formatted tracks in compliance with an ISO standard 2969/87 for the B-chain. The soundtrack signals originating from the optical analog reader 38 are read in accordance with the ISO standard 7831/86 for the A-chain. A sound level meter 70 measures the audio level of the sound output by the speakers 68 to provide feedback to the sound processor 64. Noise reduction and decoding processors (not shown) can reside between the equalizer 62 and the sound processor 62 to transform the encoded Dolby SR® tracks back into four channels and to provide the listening audience with a similar sound perspective to that produced by an original 5.1 recording format reproduced from Dolby Digital® encoded tracks. However, the expansion of the two encoded tracks to yield four tracks cannot provide the full channel separation that is achievable from the six discrete channels reproduced from the Dolby Digital® track and consequently can cause ambiguities when identifying certain defects.

Figure 3:
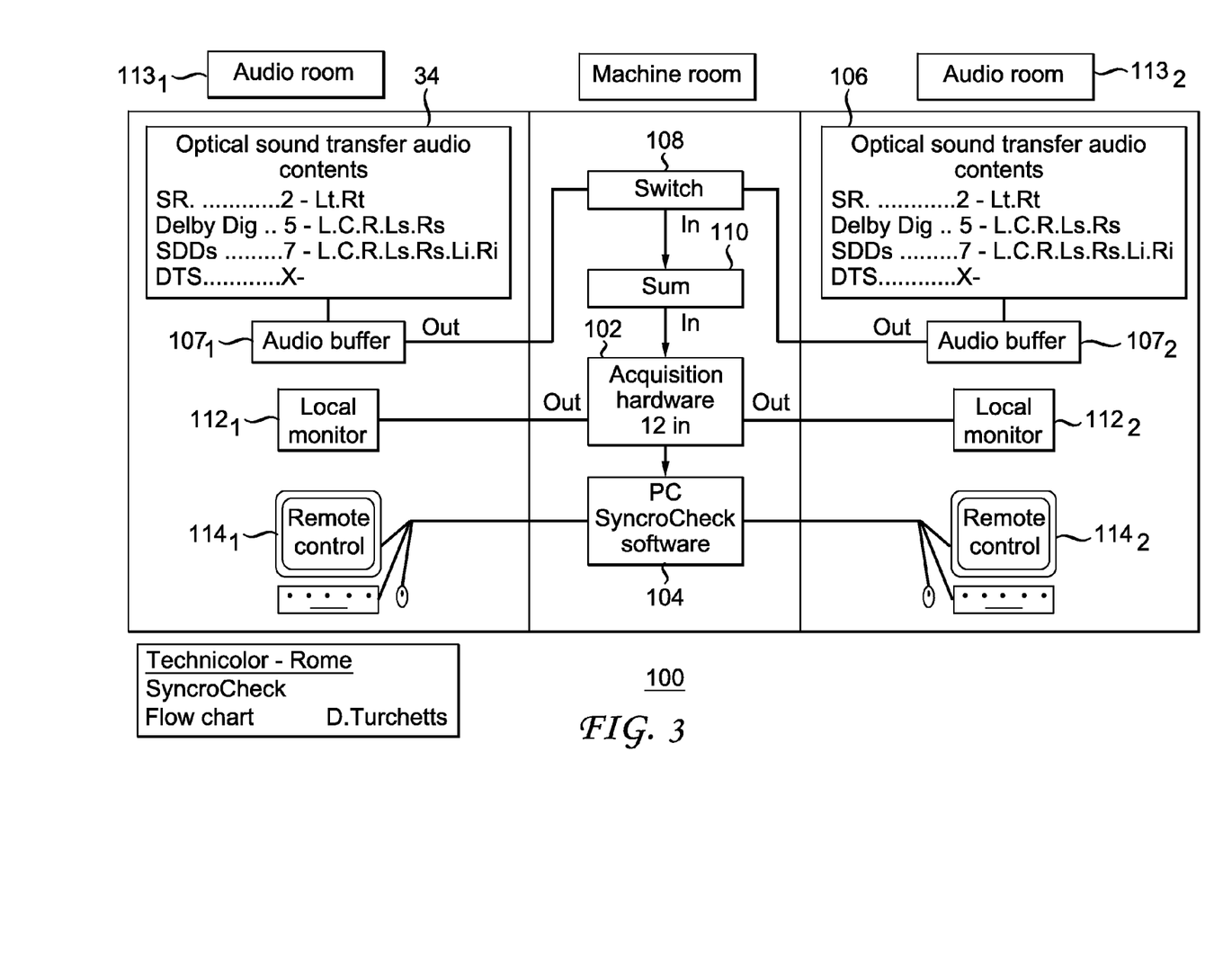
FIG. 3 is a block diagram showing a monitoring system in accordance with a preferred embodiment of the present principles.

Despite careful efforts, the sound recording process described with respect to FIG. 1 can introduce sound content loss as well as synchronicity and/or phase errors in the sound tracks recorded on the film stock 14. FIG. 3 depicts a system 100, in accordance with a preferred embodiment of the present principles for automatically detecting errors and audible defects in a multiple format movie sound track, such as the sound track on the film stock 14 of FIGS. 1 and 2. The system 100 of FIG. 3 includes an audio acquisition processor 102, typically a personal computer with an audio sound card, for executing a program 104 denominated as "PC Synchro-Check" in FIG. 3 for the purpose of examining the sound tracks on film stock 14.

The audio acquisition processor 102 receives the different formatted sound tracks for inspection from either the MO disk 34 within the optical transfer center 12 of FIG. 1 or from an storage device 106 that stores the soundtracks read from a positive print film check (not shown). The soundtracks stored in the MO 34 and those played by cinema sound systems are buffered by each one of buffers $107_1$ and $107_2$ respectively. A switch 108 selects the output of one of the buffers $107_1$ and $107_2$ for input to a summing device (preamplifier) 110 connected to the audio acquisition processor 102. In this way, the audio acquisition processor 102 receives the formatted soundtracks stored in a selected one of the MO disk 34 and the storage device 106.

Typically, the system 100 also includes a pair of audio monitors $112_1$ and $112_2$, each driven by the audio acquisition processor 102 to provide sound monitoring within an audio facility $113_1$ associated with the Optical Transfer Center 12 of FIG. 1, and within a theater room $113_2$ associated with the screening of a check positive print film, respectively. The audio room $113_1$ and the theater room $113_2$ can also include remote control units $114_1$ and $114_2$, respectively, for controlling the execution of the PC SynchroCheck program 104 by the audio acquisition processor 102. Each remote control unit typically includes a display as well as a mouse or other type of user-actuated input device.

Figure 4:
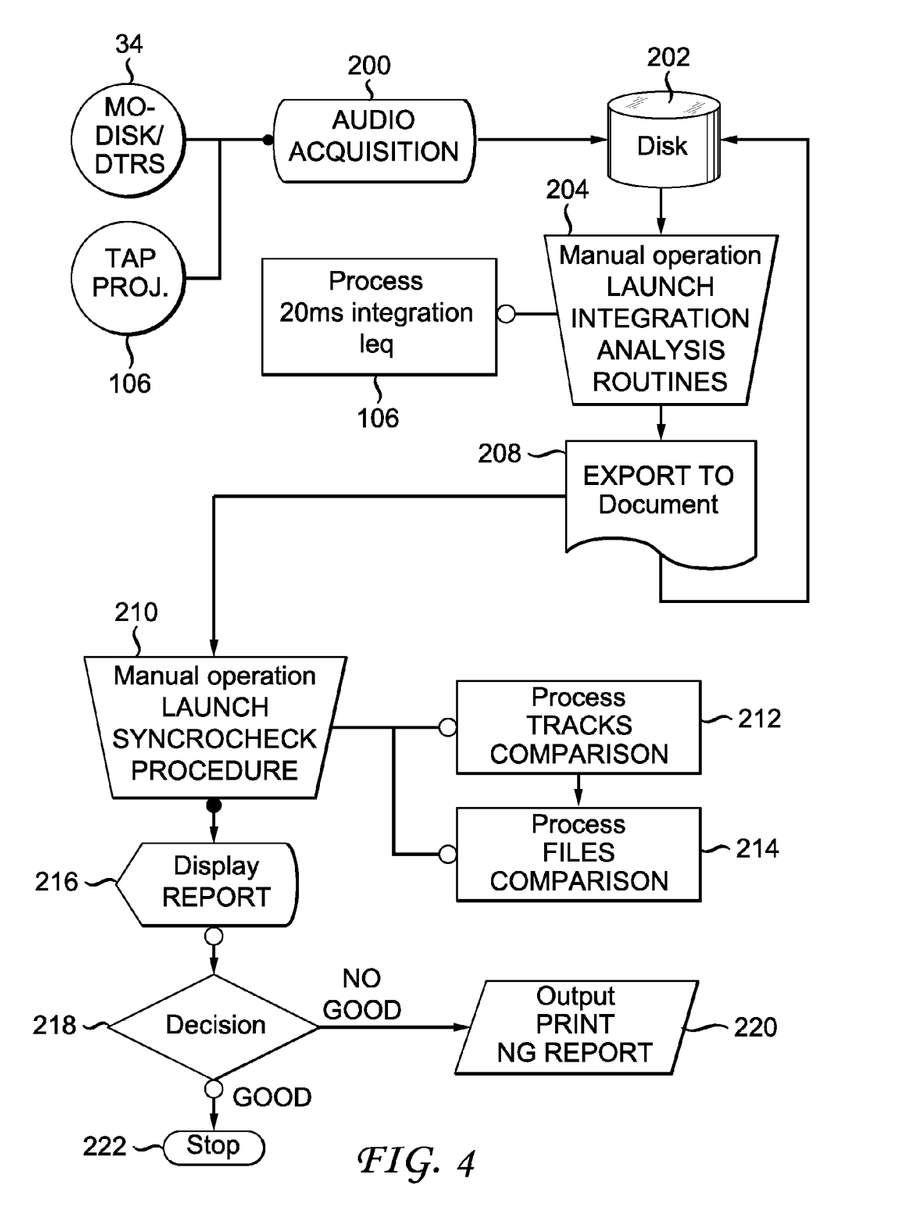
FIG. 4 depicts in flow chart form the steps of a program executed by the monitoring system of FIG. 3 to automatically check sound formats.

FIG. 4 depicts in flow form the steps performed by the PC SynchroCheck program 104 for automatically detecting errors among different formatted film sound tracks of the same language without the need for human hearing. The PC SynchroCheck program 104 commences upon execution of step 200 of FIG. 4. During step 200, the audio acquisition process processor 102 of FIG. 3 acquires audio files from one of the MO disk 34 of FIG. 1 or from storage device 106. The audio acquired during step 200 undergoes storage in a disk 202 accessible by the audio acquisition process processor 102 of FIG. 4.

Following step 200, an operator initiates a manual launch of an integration analysis routine during step 204, whereupon audio information stored on the disk 202 undergoes integration during successive intervals, as indicated by box 206. The details of the integration analysis routine performed during step 204 will become better understood with respect to FIG. 5. The integration analysis routine performed during step 204 (including the integration process of step 205) yields a set of numerical files exported to a document (i.e., a file) during step 208.

During step 210, an operator initiates an analysis of the data exported during step 208. Such data analysis occurs during execution of the PC SynchroCheck program 104 of FIG. 3 by processing a comparison of sound tracks during step 212 and by processing a comparison of files during step 214. As it will be better explained hereinafter, audio tracks comparison performed during step 212 is conducted between audio levels of paired tracks (according to the sound formats) integrated during successive time windows, typically with a duration of 20 ms each. The file comparisons involve comparison with values in a reference file, such those coming from the acquisition of a master audio source (MO-Disk and/or DTRS). Following processing of the sound track and file comparisons, a display of the results occurs during step 216. Based on such results, a decision is made during step 218 whether the soundtracks have an error. If an error exists (i.e., one or more of the sound tracks is no good), then the audio acquisition processor 102 of FIG. 3 outputs a report during step 220, for output on one or both of the remote control devices $114_1$ and $114_2$, or a similar output device, such as a display monitor or a printer (not shown). Otherwise, if no errors exist, program execution ends during step 222.

The basis for the decision made during step 218 can be found either in the comparison conducted between numerical levels of adequately paired tracks in the same acquisition file, or in the comparison (always in a track-to-track basis) against a reference acquisition file representing audio obtained from a master (i.e., the contents stored on the MO 34 of FIGS. 1 and 3) as well as the audio obtained from a positive check print film. Indeed, the same decision could involve a comparison to both the formatted file of another track, and a reference file. If either comparison shows a difference in value greater than a preset threshold, then a "No-Good" decision would result.

Figure 5:
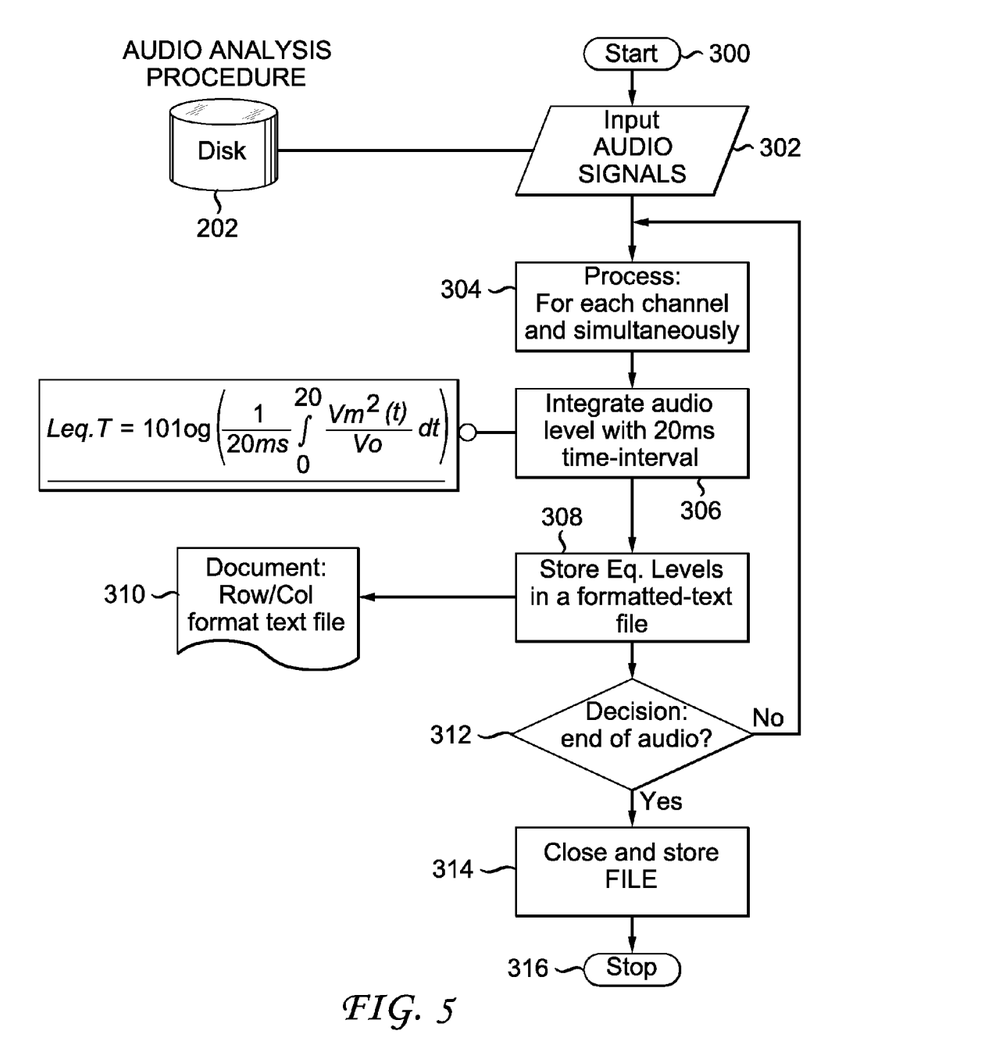
FIG. 5 depicts in flow chart form the steps of an analysis procedure executed during the program of FIG. 4.

FIG. 5 depicts the steps of integration analysis routine executed by the audio acquisition processor 102 of FIG. 3 during step 204 of FIG. 4. The integration analysis routine of FIG. 5 commences upon execution of a start instruction 300 during which initialization occurs. Thereafter, the audio acquisition processor 102 of FIG. 4 inputs the audio signals stored on the disk 202 during step 304. Next, simultaneous processing occurs for each channel (audio track), including as many as twelve channels at once. For each channel, the audio acquisition processor 102 of FIG. 4 integrates the level of the audio within a time window of prescribed duration, typically 20 ms, during step 306. The integration occurs in accordance with the relationship:

$$L_{eq,T} = 10\log\left|\left(\frac{1}{20\,\text{ms}}\int_0^{20}\frac{Vm^2(t)}{Vo^2}dt\right)\right|$$

Following the integration performed during step 306, the results are stored during step 308 yielding in a formatted text file 310, an example of which is found in Table I. The top row of the table provides channel identification, with the remaining values used for comparison purposes.

TABLE 1

| Identification | 1 | 2 | 3 | 4 | 5 | 6 | 7 | 8 | 9 | 10 | 11 | 12 |
|---|---|---|---|---|---|---|---|---|---|---|---|---|
| Nb Elements | 3880 | 3800 | 3888 | 3000 | 3880 | 3080 | 3800 | 3008 | 3088 | 3000 | 3888 | 3000 |
| Integration Value | 87.2 | 45.1 | 83.1 | 85.7 | 84.1 | 83.3 | 85.7 | 84.8 | 90.4 | 89.9 | 92.1 | 92.4 |
| | 85.5 | 53.4 | 83.2 | 86.1 | 84.3 | 83.7 | 86.3 | 85.0 | 98.7 | 89.7 | 92.4 | 92.2 |
| | 86.8 | 69.9 | 82.7 | 85.1 | 83.4 | 83.6 | 86.4 | 84.9 | 98.8 | 90.1 | 92.3 | 92.1 |
| | 85.4 | 78.0 | 83.8 | 86.4 | 84.8 | 83.6 | 85.8 | 84.6 | 98.4 | 89.3 | 92.3 | 91.8 |
| | 86.4 | 86.4 | 83.2 | 86.3 | 84.3 | 83.3 | 85.7 | 85.1 | 90.6 | 98.0 | 92.4 | 92.3 |
| | 86.7 | 89.5 | 83.3 | 85.8 | 83.9 | 83.1 | 86.3 | 84.5 | 90.3 | 98.8 | 92.0 | 92.2 |
| | 85.8 | 86.8 | 83.3 | 86.1 | 84.1 | 83.4 | 86.0 | 85.3 | 90.8 | 89.7 | 92.3 | 92.3 |
| | 85.1 | 85.6 | 83.4 | 85.2 | 83.7 | 83.4 | 86.2 | 85.4 | 90.5 | 98.8 | 92.1 | 92.1 |
| | 86.8 | 45.0 | 83.8 | 86.4 | 84.6 | 83.0 | 85.8 | 84.3 | 90.7 | 98.8 | 92.5 | 92.1 |
| | 85.8 | 47.0 | 83.3 | 86.1 | 83.8 | 52.9 | 5.30 | 84.1 | 89.6 | 90.1 | 91.9 | 92.8 |
| | 86.3 | 68.1 | 83.0 | 86.2 | 84.3 | 53.6 | 86.3 | 85.1 | 90.6 | 98.0 | 92.5 | 92.2 |
| | 87.1 | 72.0 | 82.9 | 85.6 | 84.8 | 53.6 | 86.3 | 85.3 | 98.8 | 90.2 | 91.9 | 92.0 |
| | 84.1 | 81.6 | 82.3 | 85.6 | 83.5 | 83.4 | 86.0 | 85.0 | 90.7 | 09.8 | 92.6 | 92.2 |
| | 85.2 | 83.1 | 83.1 | 85.8 | 83.3 | 83.4 | 85.6 | 84.1 | 90.4 | 90.0 | 92.2 | 91.7 |

As can now be appreciated, with a standard arrangement of channels in the multi-format movie soundtrack film stock 14 and with signals suitably assembled and routed by the audio acquisition processor 102 of FIG. 3, the PC SyncroCHECK software 104 can compare data of correspondent columns in the Table I to find differences caused by errors. In detail, the PC SyncroCHECK software reads each row and calculates differences between correspondent data. If a differences greater than predefined tolerance is found, the software signals and records relevant data of the error condition for subsequent presentation on the screen and generation of the NG Report during step 220 of FIG. 4. Each row of data is corresponds to a 20 ms widow during which the sound track audio undergoes integration. Thus, by knowing which integration step yielded bad data, it becomes possible to identify the exact footage of the film stock 14 in which the error occurred.

Once an operator launches each of the Integration Analysis and SynchroCheck procedures, each procedure occurs automatically, without any further intervention. In particular, each procedure operates without the need for any decision making. Thus, no need exists for the operator to listen to any of the sound tracks. In this way, the sound track synchronization detection process of the present principles remains free of any subjective influence.

The foregoing describes a technique for monitoring multiple sound channels, and in particular, for monitoring sound tracks on a motion picture film stock, to detect errors without the need for human analysis.

The invention claimed is:

1. A method for automatically detecting errors among different formatted sound tracks of the same language of a motion picture film, comprising the steps of:
    acquiring analog audio values within each of a plurality of successive segments of each of a plurality of different formatted sound tracks of the motion picture film;
    integrating the audio values within each successive audio segment of each different formatted track to yield a single corresponding numeric value for that segment;
    formatting the numeric values associated with the successive audio segments into a corresponding numeric file with each single numeric value corresponding to an entry in the numeric file;
    comparing each entry in the numeric file against a corresponding entry in an evaluation file representing audio obtained from a particular source; and
    indicating an error condition when the difference between entries of the formatted numerical file and the evaluation file exceeds a threshold value.

2. The method according to claim 1 wherein the comparison step comprises the step of comparing the entry of the numeric file against a corresponding entry of an evaluation file corresponding to a formatted numeric file associated with a different formatted sound track.

3. The method according to claim 1 wherein the comparison step further comprises the step of comparing the entry of the numeric file against a corresponding entry of an evaluation file corresponding to a reference file representing audio obtained from a particular source.

4. The method according to claim 3 wherein the reference file is obtained from a master source.

5. The method according to claim 3 wherein the reference file is obtained from a positive check print film containing multi-formatted sound tracks.

6. The method according to claim 1 wherein the step of indicating an error condition further comprises the step of generating a report.

7. A method for automatically detecting errors among different formatted sound tracks of the same language on a motion picture film, comprising the steps of:
    acquiring analog audio values within each of a plurality of successive segments of each of a plurality of different formatted sound tracks on the motion picture film;
    integrating the audio values within each successive audio segment of each different formatted track to yield a single corresponding numeric value for that segment;
    formatting the numeric values associated with the successive audio segments into a corresponding numeric file with each single numeric value corresponding to an entry in the numeric file;
    comparing the numeric file against an evaluation file representing audio obtained from a different multi-formatted sound track and against a reference file representing audio obtained from particular source; and
    comparing each entry in the numeric file against a corresponding entry in an evaluation file representing audio obtained from a different multi-formatted sound track and against a corresponding entry in an reference file representing audio obtained from particular source; and
    indicating an error condition when the difference between the entry in the formatted numerical file and the entry in either of the evaluation file or the reference file exceeds a threshold value.

8. Apparatus for automatically detecting errors among different formatted sound tracks of the same language on a motion picture film, comprising:
    means for acquiring analog audio values within each of a plurality of successive segments of each of a plurality of different formatted sound tracks of the motion picture film;
    means for integrating the audio values within each successive audio segment of each different formatted track to yield a single corresponding numeric value for that segment;
    means for formatting the numeric values associated with the successive audio segments into a corresponding numeric file with each single numeric value corresponding to an entry in the numeric file;
    means for comparing each entry in the numeric file against a corresponding entry in an evaluation file representing audio obtained from a particular source; and
    means for indicating an error condition when the difference between entries of the formatted numerical file and the evaluation file exceeds a threshold value.

9. The apparatus according to claim 8 wherein the comparison means compares the entries in the numeric file against the entries in an evaluation file corresponding to a formatted numeric file associated with a different formatted sound track.

10. The apparatus according to claim 8 wherein the comparison means compares the entries in the numeric file against the entries in the evaluation file corresponding to a reference file representing audio obtained from a particular source.

11. The apparatus according to claim 10 wherein the reference file is obtained from a master source.

12. The apparatus according to claim 10 wherein the reference file is obtained from a positive check print film containing multi-formatted sound tracks.

13. A method for automatically detecting errors among different formatted sound tracks of the same language on a motion picture film, comprising the steps of:
    acquiring analog audio values within each of a plurality of successive segments of each of a plurality of different formatted sound tracks of the motion picture film;

integrating the audio values within each successive audio segment of each different formatted track to yield a single corresponding numeric value for that segment;

formatting the numeric values associated with the successive audio segments into a corresponding numeric file with each single numeric value corresponding to an entry in the numeric file;

comparing each entry in the numeric file against a corresponding entry in an evaluation file representing audio obtained from a particular source; and indicating an error condition when the difference between entries of the formatted numerical file and the evaluation file exceeds a threshold value; and identifying the location on the film where the error occurred in accordance with error condition associated with the entry of the numeric file.

* * * * *